US011868059B2

(12) United States Patent
Yamamoto et al.

(10) Patent No.: US 11,868,059 B2
(45) Date of Patent: Jan. 9, 2024

(54) OPTICAL SCANNING DEVICE, HOUSING COVER, OPTICAL BOX AND IMAGE FORMING APPARATUS

(71) Applicant: SHARP KABUSHIKI KAISHA, Sakai (JP)

(72) Inventors: Hiroshi Yamamoto, Sakai (JP); Atsuo Nakao, Sakai (JP); Hidenori Sato, Sakai (JP); Takaharu Motoyama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/705,106

(22) Filed: Mar. 25, 2022

(65) Prior Publication Data

US 2022/0342337 A1 Oct. 27, 2022

(30) Foreign Application Priority Data

Apr. 27, 2021 (JP) ................................. 2021-074621
May 13, 2021 (JP) ................................. 2021-081384

(51) Int. Cl.
*G03G 15/04* (2006.01)
*G03G 15/043* (2006.01)

(52) U.S. Cl.
CPC ... *G03G 15/04036* (2013.01); *G03G 15/0435* (2013.01)

(58) Field of Classification Search
CPC ..................... G03G 15/04036; G03G 15/0435
See application file for complete search history.

(56) References Cited

U.S. PATENT DOCUMENTS 9,618,872 B2 * 4/2017 Hosoi ................ G03G 21/1666
9,906,663 B2 * 2/2018 Otsubo ............ G03G 15/04036
9,927,732 B2 * 3/2018 Otsubo .............. G03G 21/1666
2010/0053714 A1 3/2010 Shirai

FOREIGN PATENT DOCUMENTS

JP 2006-150687 A 6/2006
JP 2010-54803 A 3/2011
JP 2019213395 A * 12/2019 ......... B60R 16/0215

OTHER PUBLICATIONS

English machine translation of Kawamura (JP 2019213395 A) (Year: 2019).*

* cited by examiner

*Primary Examiner* — Walter L Lindsay, Jr.
*Assistant Examiner* — Geoffrey T Evans
(74) *Attorney, Agent, or Firm* — ScienBiziP, P.C.

(57) ABSTRACT

An optical scanning device comprises an optical box that houses an optical component(s). The optical box includes a box main body and a cover member. A first engaging portion is formed on a side wall of the box main body, and a second engaging portion that engages with the first engaging portion is formed on a first fitting wall portion of the cover member. The box main body is provided with a vertical wall that is erected inside the first engaging portion. Moreover, there is formed on the cover member with a first barrier wall that is protruded downward from a top wall so as to enter a space between the first engaging portion and the vertical wall.

7 Claims, 11 Drawing Sheets

OPTICAL SCANNING DEVICE, HOUSING COVER, OPTICAL BOX AND IMAGE FORMING APPARATUS

CROSS REFERENCE OF RELATED APPLICATION

This application claims priorities to Japanese Patent Application No. 2021-74621 filed on Apr. 27, 2021 and Japanese Patent Application No. 2021-81384 filed on May 13, 2021, and the entire contents of which are incorporated herein by reference.

BACKGROUND OF THE INVENTION

Field of the Invention

The present invention relates to an optical scanning device, a housing cover, an optical box and an image forming apparatus. Specifically, the present invention relates to an optical scanning device comprising an optical component(s) and an optical box that houses the optical component(s), for example, and an image forming apparatus. Moreover, the present invention relates to a housing cover used for an optical box that houses an optical component(s), and to an optical box and an image forming apparatus that are provided with the housing cover.

Description of the Related Art

An example of a conventional optical scanning device is disclosed in Japanese Patent Application Laying-open No. 2006-150687 [B41J 2/44, G02B 26/10, G03G15/14](Patent Literature 1) laid-open on Jun. 15, 2006. The optical scanning device (optical writing device) of Patent Literature 1 comprises a housing to which an optical element is attached, and a cover member that closes an upper opening of the housing. Then, a fastening portion between two members, the housing and the cover member is provided in a multiple places so that such a fastening means does not fasten and fix completely the two members in all directions.

In the technology disclosed in Patent Literature 1, as a fastening means for the housing (box main body) and the cover member (lid member), a fastening means of a snap-fit type that utilizes deflection (elastic deformation) of the member is used. That is, although a hole (locking hole) that engages with a projection (locking projection) of the housing is formed on the cover member, this hole penetrates to a top wall of the cover member because of the mold. For this reason, according to the technology of Patent Literature 1, there is a possibility that foreign matters such as particles and dust may invade into the optical box from a portion of the hole of the cover member.

SUMMARY OF THE INVENTION

Therefore, it is a primary object of the present invention to provide a novel optical scanning device, housing cover, optical box and an image forming apparatus.

It is another object of the present invention to provide an optical scanning device and image forming apparatus, capable of appropriately preventing an invasion of foreign matters into an optical box.

The present invention adopts following configurations in order to solve the above-described problem.

The first invention is an optical scanning device comprising an optical component and an optical box that houses the optical component, wherein the optical box includes a box main body having a bottom wall and a frame-shaped side wall erected form a peripheral edge portion of the bottom wall and a cover member having a top wall that closes an upper opening of the box main body and a frame-shaped first fitting wall portion that is outer-fit to the side wall, further comprising: a first engaging portion that is formed on the side wall; a second engaging portion that is formed on the first fitting wall portion in an elastically deformable manner, which engaging with the first engaging portion so as to lock the cover member to the box main body; a vertical wall that is erected on the box main body so as to form a space inside the first engaging portion, and has both side end portions coupled to the side wall; and a first barrier wall that is protruded from the top wall toward the bottom wall so as to enter the space between the first engaging portion and the vertical wall, and has both side end portions coupled to the first fitting wall.

According to the present invention, since the vertical wall is provided on the box main body so as to form the space inside the first engaging portion and the first barrier wall that enters the space is provided on the cover member, it is possible to appropriately prevent an invasion of foreign matters into the optical box.

The above described objects and other objects, features, aspects and advantages of the present invention will become more apparent from the following detailed description of the present invention when taken in conjunction with the accompanying drawings.

DETAILED DESCRIPTION OF NON-LIMITING EXAMPLE EMBODIMENTS

First Embodiment

Figure 1:
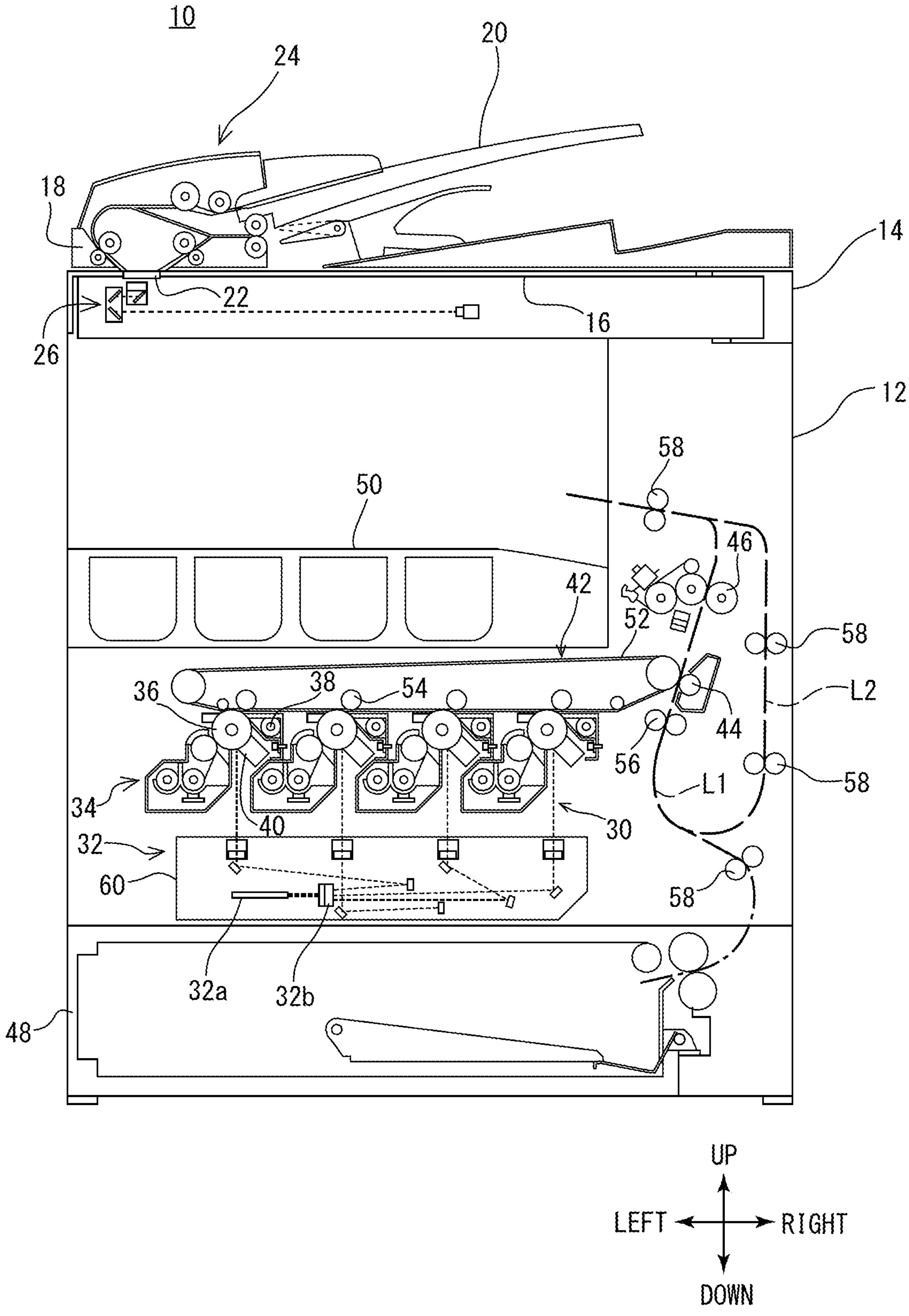
FIG. 1 is a schematic sectional view showing internal structure of an image forming apparatus of a first embodiment according to the present invention.

With reference to FIG. 1, an image forming apparatus 10 that is an embodiment according to the present invention is a multifunction peripheral having a copy function, a printer function, a scanner function, a facsimile function, etc., and forms a multicolor or monochromatic image on a sheet (recording medium) with an electrophotography system. As details will be described later, the image forming apparatus 10 comprises an exposure unit 32 that is an example of an optical scanning device.

First, basic structure of the image forming apparatus 10 will be schematically described. In addition, in this first embodiment, a front-rear direction (depth direction) of the image forming apparatus 10 and their constituent members is defined on the assumption that a surface facing a standing position of a user who operates an image forming apparatus 10, i.e., a surface provided with an operation panel (not shown) is a front surface. Moreover, a left-right direction (horizontal direction) of the image forming apparatus 10 and their constituent members is defined based on a state where the image forming apparatus 10 is viewed from the user. A front-rear, left-right and up-down directions agree with directions indicated by arrows in this figure.

As shown in FIG. 1, the image forming apparatus 10 includes an apparatus main body 12 provided with an image forming portion 30, etc., and an image reading device 14 arranged thereabove.

This image reading device 14 is provided with an original platen 16 that is formed of transparent material. An original platen cover 18 is attached above the original platen 16 via a hinge etc. so as to be openable and closable freely. This platen cover 18 is provided with an ADF (Automatic Document Feeder) 24 that automatically feeds an original that is placed on an original tray 20 one by one to an image reading position 22. Moreover, although illustration is omitted, an operation panel that receives an input operation such as a print instruction etc. by a user is provided on a front surface side of the original platen 16. This operation panel is suitably provided with a display such as a touch panel display and various kinds of operation buttons, etc.

Moreover, the image reading device 14 is incorporated with an image reading portion 26 comprising a light source, a plurality of mirrors, a focusing lens, a line sensor, etc. The image reading portion 26 exposes a surface of an original by the light source, and leads a reflected light that is reflected from the surface of the original to the focusing lens by the plurality of mirrors. Then, the reflected light is focused onto photoreceptor elements of the line sensor by the focusing lens. The line sensor detects brightness and chromaticity of the reflected light that is focused onto the photoreceptor elements, and produces image data based on an image of the original surface. As the line sensor, a CCD (Charge Coupled Device), a CIS (Contact Image Sensor), etc. may be used.

The apparatus main body 12 is incorporated with a control portion (not shown) including a CPU, memory, etc., and the image forming portion 30, etc. The control portion sends control signals to respective components of the image forming apparatus 10 according to the input operation to the operation panel, etc. so as to make the image forming apparatus 10 perform various operations.

The image forming portion 30 comprises the exposure unit 32, a developing unit 34, a photoreceptor drum 36, a cleaner unit 38, a charger 40, an intermediate transfer belt unit 42, a transfer roller 44, a fixing unit 46, etc., and forms an image on a sheet that is fed from a sheet feeding tray 48, and discharges a sheet having been formed with an image onto a sheet discharge tray 50. As image data for forming an image on a sheet, image data read by the image reading portion 26 or image data transmitted from an external computer, etc. can be utilized.

In addition, image data treated in the image forming apparatus 10 corresponds to a color image of four (4) colors of black (K), cyan (C), magenta (M) and yellow (Y). Therefore, the developing unit 34, the photoreceptor drum 36, the cleaner unit 38 and the charger 40 are respectively provided by four (4) so that four (4) kinds of latent images corresponding to respective colors can be formed, and four (4) image stations are constituted by these components.

The photoreceptor drum 36 is an electrostatic latent image bearing member having a photosensitive layer that is formed on a surface of a circular cylindrical substrate having conductivity, and is rotatable around an axis line with a driving portion not shown. The charger 40 is a member for charging a surface of the photoreceptor drum 36 at a predetermined electric potential.

The exposure unit 32 is constituted as a laser scanning unit that includes optical components such as a laser diode 32*a*, a polygon mirror 32*b*, etc., and an optical box 60 that houses the optical components with a predetermined arrangement manner, and is arranged below the photoreceptor drum 36. The exposure unit 32 forms an electrostatic latent image according to the image data on the surface of the photoreceptor drum 36 by exposing the surface of the photoreceptor drum 36 having been charged. In addition, specific structure of the optical box 60 will be described later.

The developing unit 34 visualizes the electrostatic latent image that is formed on the photoreceptor drum 36 with toners of four (4) colors (YMCK), and comprises a developing roller that supplies a toner to the photoreceptor drum 36, etc. The cleaner unit 38 removes a toner that remains on the surface of the photoreceptor drum 36 after transfer of the toner image to the intermediate transfer belt 52.

The intermediate transfer belt unit 42 comprises the intermediate transfer belt 52, a driving roller, a driven roller, four (4) intermediate transfer rollers 54, etc., and is arranged above the photoreceptor drum 36. The intermediate transfer belt 52 is provided to be brought into contact to respective photoreceptor drums 36, and by using the intermediate transfer rollers 54 to sequentially superimpose and transfer the toner images of respective colors formed on the photoconductor drums 36 onto the intermediate transfer belt 52, a multicolor toner image is formed on the intermediate transfer belt 52. Moreover, the transferal roller 44 is arranged near the driving roller, and when a sheet passes through a NIP region between the intermediate transfer belt 52 and the transfer roller 44, the toner image formed on the intermediate transferal belt 52 is transferred onto the sheet.

The fixing unit 46 comprises a heat roller and a pressure roller, and is arranged above the transfer roller 44. The heat roller is controlled to be rendered at a predetermined fixing temperature, and when the sheet passes a NIP region between the heat roller and the pressure roller, the toner image that is transferred to the sheet is melted, mixed and pressured, whereby the toner image can be heat-fixed on the sheet.

Moreover, in the apparatus main body 12, there is formed with a first sheet feeding path L1 for feeding a sheet from the sheet feeding tray to a sheet discharge tray 50 via a sheet stop roller 56, the transfer roller 44 and the fixing unit 46. Moreover, there is a formed with a second sheet feeding path L2 for returning, when performing duplex printing to the sheet, the sheet that simplex printing has been finished and passed through the fixing unit 46 to the first sheet feeding path L1 on an upstream side in a sheet feeding direction of the transfer roller 44. A plurality of feeding rollers 58 for auxiliary imparting a driving force to the sheet are appropriately provided in the first paper feeding path L1 and the second paper feeding path L2.

Next, the structure of the optical box 60 provided on the exposure unit 32 will be specifically described. In addition, terms such as "outer-fit(ting)", "inner-fit(ting)", "fitting" and "fit" referred to in this specification are used in a concept including not only tightly and exactly fitting, but also fitting having some play (gap).

Figure 2:
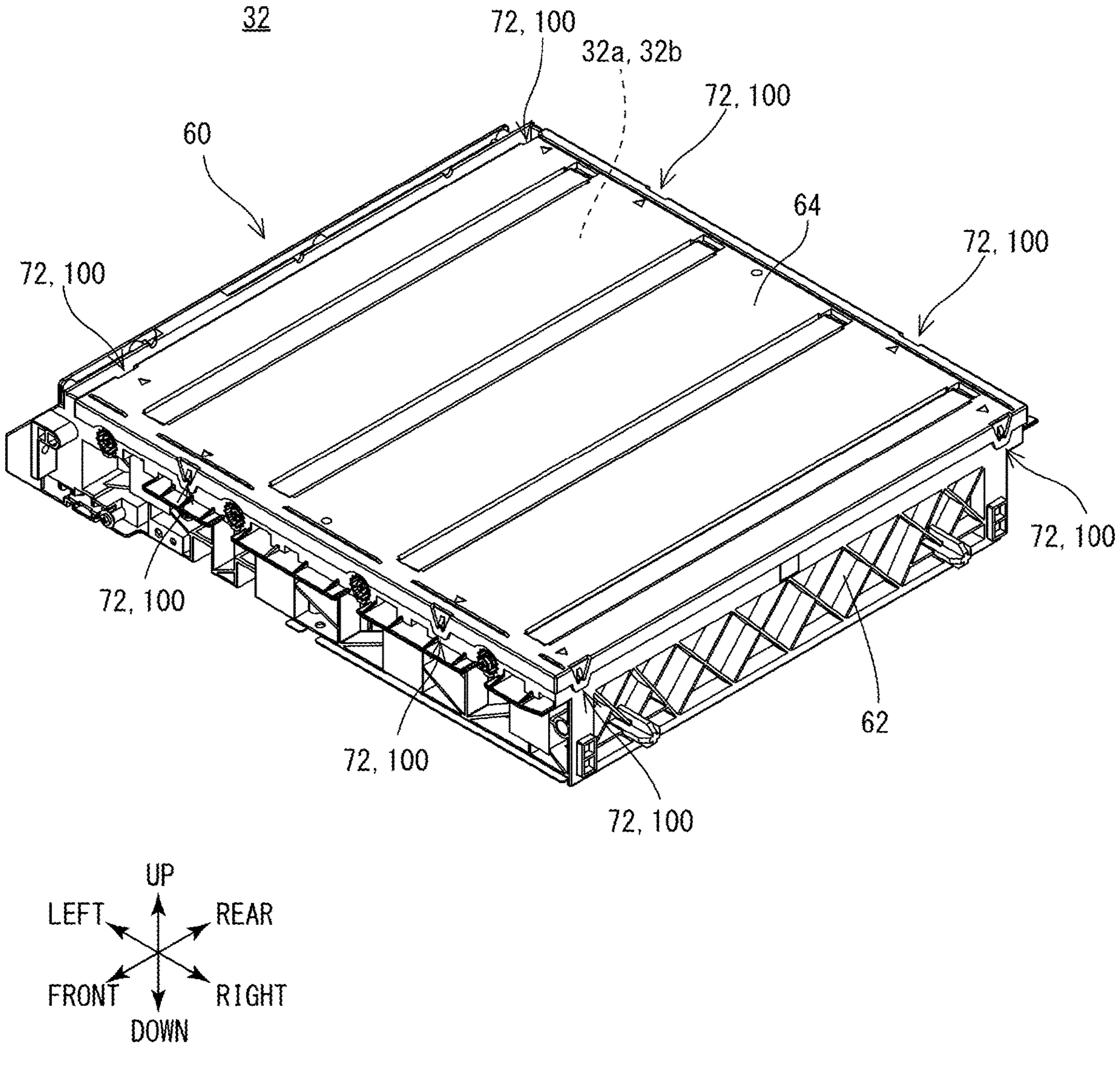
FIG. 2 is a perspective view showing an appearance of an exposure unit.

As shown in FIG. 2, the exposure unit 32 comprises the optical box 60 that houses an optical component(s), such as the laser diode 32*a*, etc. The optical box 60 includes a box main body (housing) 62 having an upper opening, in which an optical component(s) are attached in a predetermined arrangement manner, and a cover member (housing cover) 64 detachably attached to an upper portion of the box main body 62. This cover member 64 is locked to (prevented from being fallen from) the box main body 62 with engagement of a first engaging portion 72 and a second engaging portion 100 both described later.

Figure 3:
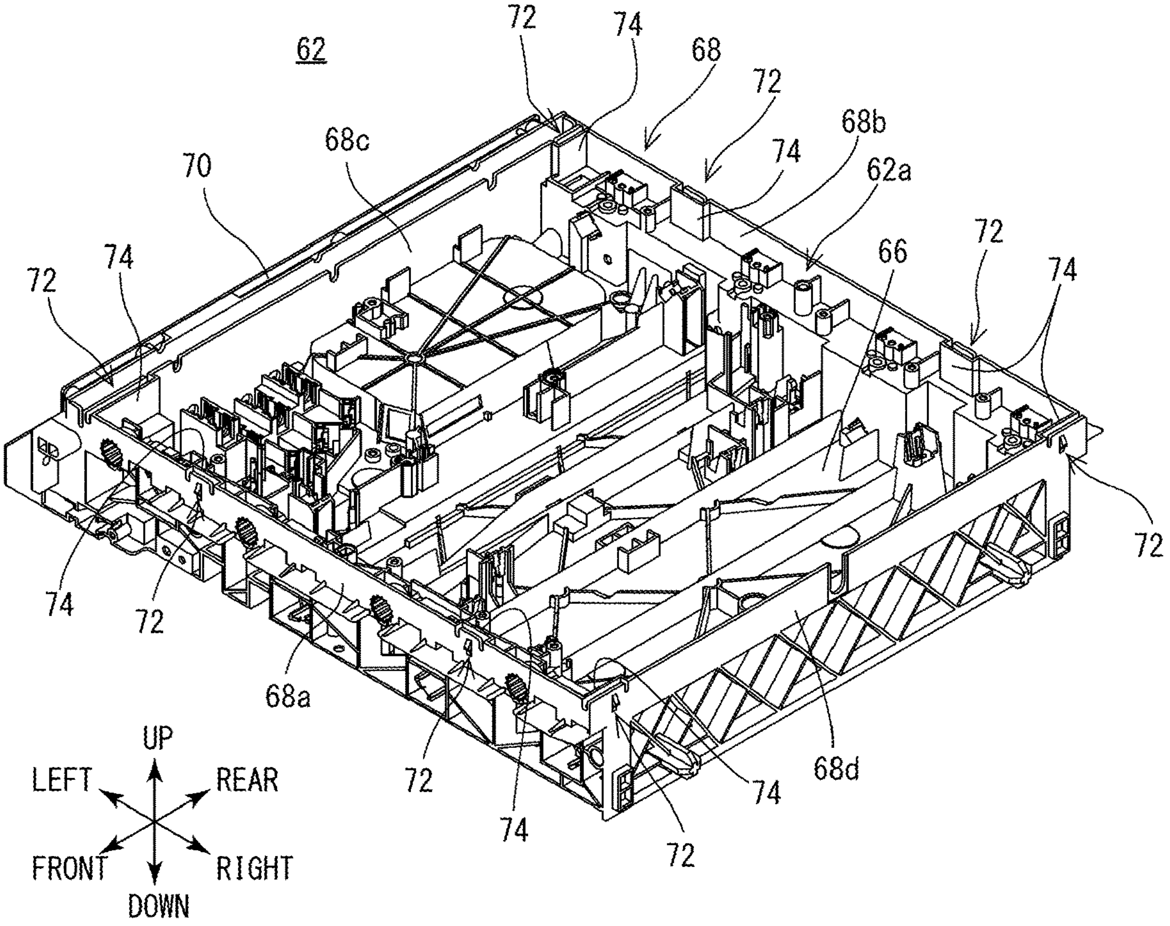
FIG. 3 is a perspective view showing a box main body of an optical box provided on the exposure unit.
Figure 4:
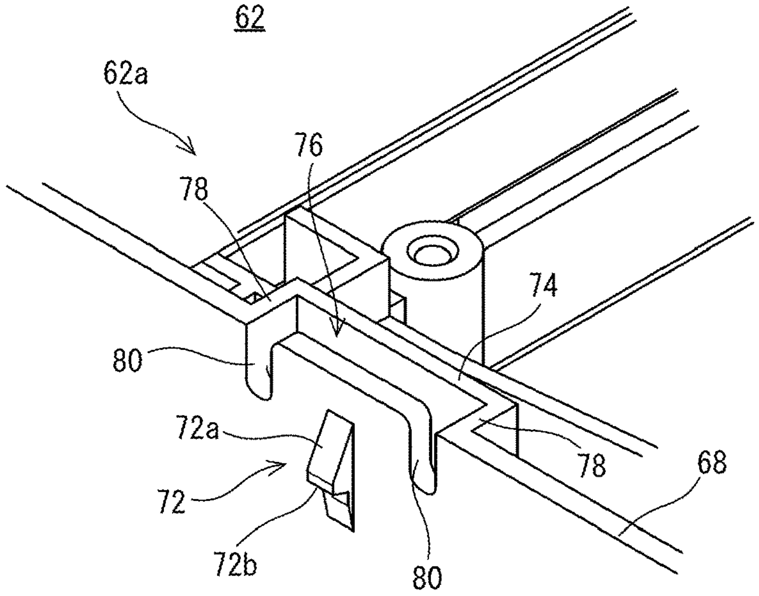
FIG. 4 is a perspective view showing a part around a first engaging portion of the box main body.
Figure 5:
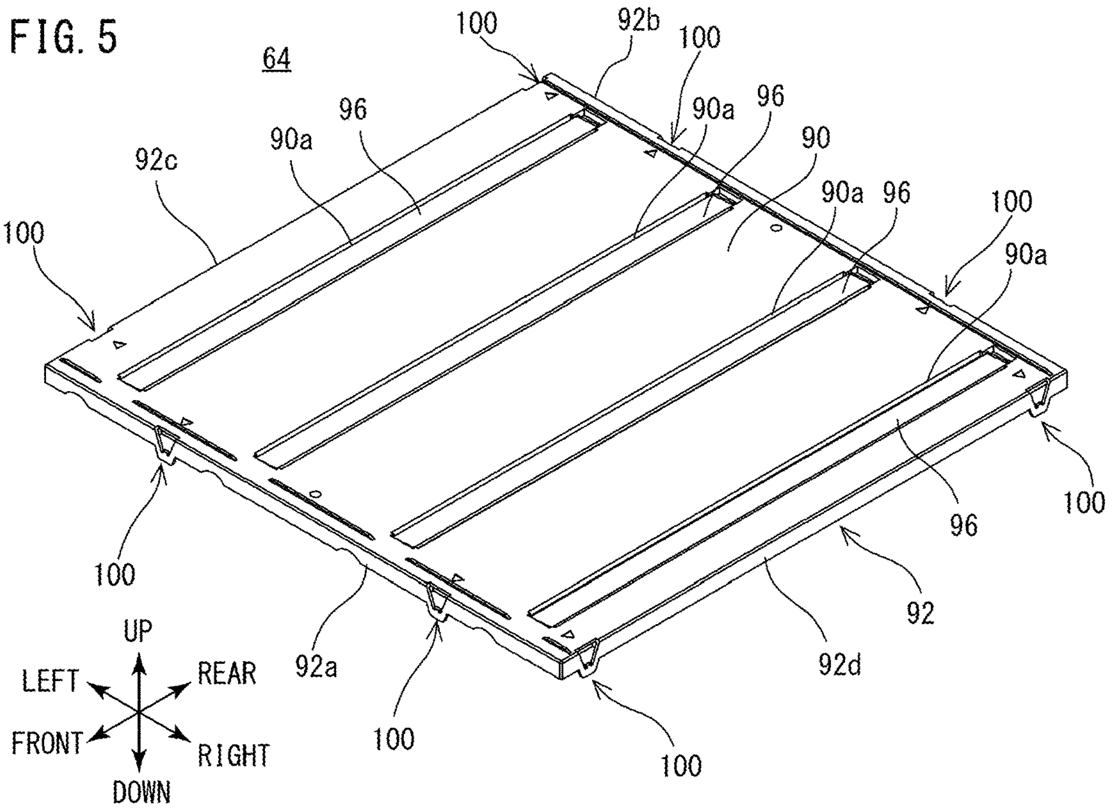
FIG. 5 is a perspective view showing a top surface side of a cover member of the optical box.
Figure 6:
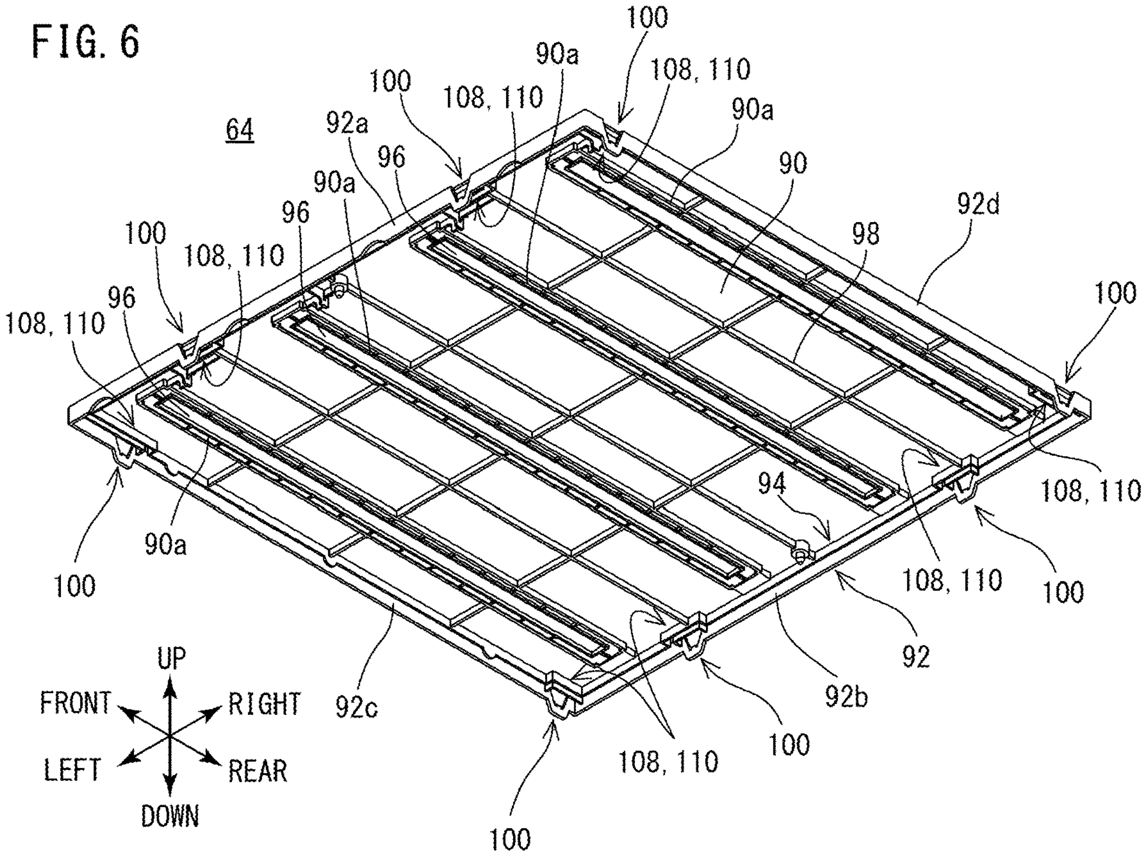
FIG. 6 is a perspective view showing a bottom surface side of the cover member.

As shown in FIG. 2-FIG. 4, the box main body 62 has a bottom wall 66 that is a rectangular shape in a plan view, and a side wall 68 that is erected from a peripheral edge portion of the bottom wall 66. The side wall 68 is formed in a rectangular frame-shape (annular) including a front wall 68*a*, a rear wall 68*b*, a left wall 68*c* and a right wall 68*d*, and an upper opening 62*a* that is opened upward is formed at an upper end portion of this side wall 68. In addition, in this first embodiment, the box main body 62 comprises a box protrusion 70 that is protruded leftward from the left wall 68*c*. Then, the cover member 64 is attached to the box main body 62 so as to cover, except this box protrusion 70, an upper portion of the box main body 62, i.e., the upper opening 62*a* formed by the side wall 68.

A plurality of first engaging portions 72 are formed on an outer side surface of the side wall 68. In this first embodiment, two first engaging portions 72 are provided, with a space therebetween in a horizontal direction, on each of four wall portions constituting the side wall 68, i.e., the front wall 68*a*, the rear wall 68*b*, the left wall 68*c* and the right wall 68*d*. Moreover, each of the first engaging portions 72 is provided at a predetermined space downward from the upper end of the side wall 68. As well shown in FIG. 4, in this first embodiment, the first engaging portion 72 is a locking projection (projected portion) that is engageable with a locking hole 104 of the cover member 64 described later. The first engaging portion (locking projection) 72 has an inclined surface 72*a* formed to be inclined so that a distance from the outer side surface of the side wall 68 becomes longer as it goes downward, and a stopper surface 72*b* that is connected to a lower end of the inclined surface 72*a* and formed substantially perpendicular to the outer side surface of the side wall 68.

Furthermore, there is formed on the box main body 62 with a vertical wall 74 that is formed in each position corresponding to each of the first engaging portions 72. The vertical wall 74 is formed in a flat plate shape extending in parallel with the side wall 68 on which the corresponding first engaging portion 72 is formed, and is erected on the box main body 62 so as to form a predetermined space 76 inside the first engaging portion 72. Moreover, both side end portions of the vertical wall 74 is coupled to the side wall 68 via coupling walls 78 extended in a direction that orthogonally intersects to the vertical wall 74. That is, the space 76 formed between the first engaging portion 72 and the vertical wall 74 and an internal space (housing space for the optical component(s)) of the box main body 62 are blocked out by the vertical wall 74 and the coupling walls 78. A width of the space 76 (distance between an inner surface of the side wall 68 and an outer surface of the vertical wall 74) is 3.0 mm, for example, and a height of the space 76 (i.e., protruded height of the vertical wall 74) is 20.0 mm, for example.

Moreover, there is formed on the side wall with slits 80 extended downward from the upper end of the side wall 68 at both sides of the first engaging portion 72. Furthermore, in this first embodiment, top surfaces of the side wall 68, the vertical wall 74 and the coupling wall 78 are arranged at the same height position, and a bottom surface of a top wall 90 of the cover member 64 is supported by the top surfaces of these side walls 68, the vertical wall 74 and the coupling wall 78.

However, the side end portions of the vertical wall 74 may be directly coupled to the side wall 68 dependent on a position that the vertical wall 74 is formed, or may be coupled to the side wall 68 via the coupling walls 78 extended to the flush surface with the vertical wall 74. Moreover, the vertical wall 74 does not necessarily have to be formed in a flat plate shape, and may be formed in a semi-cylindrical shape or the like. Furthermore, the top surfaces of the vertical wall 74 and the coupling wall 78 does not necessarily have to be arranged in the same height position as the top surface of the side wall 68, and may be located in a position lower than the top surface of the side wall 68.

As shown in FIG. 5-FIG. 8, the cover member 64 comprises a top wall (closing portion) 90 that closes the upper opening 62*a* of the box main body 62, and a pair of fitting wall portions 92 and 94 that are engaged with an upper portion of the side wall 68 of the box main body 62. The pair of fitting wall portions 92 and 94 include a first fitting wall portion (side wall portion) 92 that is outer-fit with the side wall 68, and a second fitting wall portion 94 that is inner-fit with the side wall 68.

The top wall 90 is formed in a rectangular plate shape in a plan view. There are formed on the top wall 90 with four rectangular shape windows 90*a* that allow a light emitted from the optical component(s) to pass, which are formed in a manner of being extended in the front-rear direction and spaced with each other in the left-right direction. A glass plate 96 is adhered to each of these windows 90*a*. Moreover, a reinforcing rib 98 extended in a grid shape is formed on a lower surface side of the top wall 90.

The first fitting wall portion 92 is formed to be protruded downward from a peripheral edge portion of the top wall 90. The first fitting wall portion 92 is formed in a rectangular frame shape including a front wall portion 92*a*, a rear wall portion 92*b*, a left wall portion 92*c* and a right wall portion 92*d*. On the other hand, the second fitting wall portion 94 is provided inside the first fitting wall portion 92 in a position with a predetermined space from the first fitting wall portion 92 to be protruded downward from a peripheral edge portion of the top wall 90. As similar to the first fitting wall portion 92, the second fitting wall portion 94 is formed also in a rectangular frame shape including a front wall portion, a rear wall portion, a left wall portion and a right wall portion. By sandwiching the side wall 68 of the box main body 62 by the pair of fitting wall portions 92 and 94 each formed in a rectangular frame shape, a motion of the cover member 64 in the front-rear direction and the left-right direction with respect to the box main body 62 can be controlled.

Moreover, there are formed on the first fitting wall portion 92 with a plurality of second engaging portions (claw portions) 100 each of which is engaged with each of the plurality of first engaging portions 72 provided on the box main body 62. In this first embodiment, corresponding to the first fitting wall portions 72, the second engaging portions are provided by two on each of the four wall portions constituting the first fitting wall portion 92, i.e., the front wall portion 92*a*, the rear wall portion 92*b*, the left wall portion 92*c* and the right wall portion 92*d*. Moreover, the second engaging portions 100 provided on the two wall portions (front wall 92*a* and the rear wall portion 92*b*) opposite to each other in a direction that the window 90*a* is extended are located in positions deviate from an extending line of the window 90*a* in a plan view. By forming the second engaging portions 100 on each of the four wall portions of the first fitting wall portion 92 that is formed in a rectangular frame shape, the cover member 64 can be effectively prevented from coming off. Moreover, although a portion located on the extending line of the window 90*a* in the top wall 90 becomes lower in strength compared with other portions, by providing the second engaging portions 100 in the positions deviate from the extending line of the window 90*a* in a plan view, damage to that portion can be suppressed.

Figure 7:
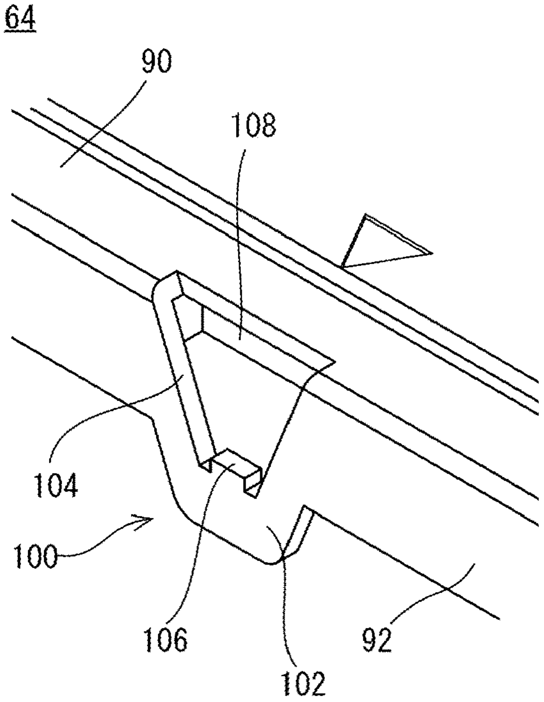
FIG. 7 is a perspective view showing a state where a part around a second engaging portion of the cover member is viewed from an upper side.
Figure 8:
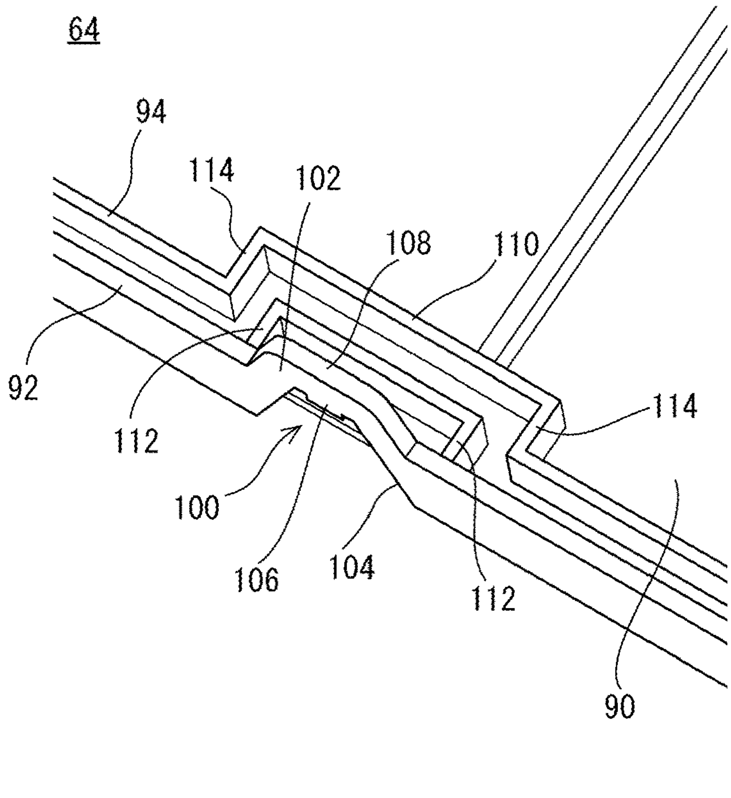
FIG. 8 is a perspective view showing a state where the part around the second engaging portion of the cover member is viewed from a lower side.

As well shown in FIG. 7, each of the plurality of second engaging portions 100 has a protrusion 102 that is provided to be protruded downward from a lower end of the first fitting wall portion 92, and a locking hole 104 that is engaged with the first engaging portion (locking projection) 72. An upper portion of this locking hole 104 penetrates the top wall 90. Moreover, a positioning projection 106 is provided on a bottom portion of the locking hole 104 to be protruded upward, which abuts on the stopper surface 72*b* from below. Each of such a plurality of second engaging portions 100 is provided on the first fitting wall portion 92 of the cover member 64 to be elastically deformable toward an outside. That is, the whole cover member 64 is formed of the injection molding of a synthetic resin, and thus, the second engaging portion 100 becomes elastically deformable in a thickness direction thereof. A thickness of each of the first fitting wall portion 92 and the second engaging portion 100 is 1.5 mm, for example.

Furthermore, there are formed on the cover member 64 with a pair of barrier walls 108 and 110 in positions corresponding to the plurality of vertical walls 74 (i.e., positions corresponding to the first engaging portion 72 and the second engaging portions 100), respectively so as to sandwich the vertical wall 74. As well shown in FIG. 8 (and FIG. 11), the pair of barrier walls 108 and 110 include a first barrier wall 108 arranged outside the vertical wall 74, and a second barrier wall 110 arranged inside the vertical wall 74.

The first barrier wall 108 is formed in a flat plate shape protruded downward (i.e., toward the bottom wall 66 of the box main body 62) from the top wall 90 so as to enter the space 76 between the first engaging portion 72 and the vertical wall 74 that are formed in the box main body 62, that is, so as to be extended up to a position that at least a part thereof is superposed with the vertical wall 74 in a height direction (up-down direction). The both end portions of this first barrier wall 108 are coupled to the first fitting wall portion 92 via first coupling walls 112 that are extended in a direction orthogonally intersecting to the first barrier wall 108. On the other hand, the second barrier wall 110 is formed in a shape of flat plate protruded downward (i.e., toward the bottom wall 66 of the box main body) from the top wall 90 so as to sandwich the vertical wall 74 with the first barrier wall 108, that is, so as to be extended up to a position that at least a part thereof is superposed with the vertical wall 74 in the height direction. The both end portions of this second barrier wall 110 are coupled to the second fitting wall portion 94 via second coupling walls 114 that are extended in a direction orthogonally intersecting to the second barrier wall 110. A thickness of each of the first barrier wall 108 and the second barrier wall 110 is 1.0 mm, for example, and a protruded height from the top wall 90 (i.e., length overlapping with the vertical wall 74 in the height direction) of each of the first barrier wall 108 and the second barrier wall 110 is 5.0 mm, for example.

However, the both end portions of the first barrier wall 108 may be directly coupled to the first fitting wall 92, or may be coupled to the first fitting wall 92 via the first coupling walls 112 extended to the flush surface with the first barrier wall 108. Moreover, the first barrier wall 108 does not necessarily have to be formed in a flat plate shape, and may be formed in a semi-cylindrical shape or the like corresponding to a shape of the vertical wall 74. Furthermore, as to the first barrier wall 108, a lower surface thereof should be arranged below a top surface of the vertical wall 74, and the protruded height of the first barrier wall 108 from the top wall 90 is changeable properly. These are the same for the second barrier wall 110.

In the above-described optical box 60, when attaching the cover member 64 to the box main body 62, the second engaging portion 100 is deformed elastically in a direction away from the box main body 62 because the protrusion 102 of the second engaging portion 100 rides on the inclined surface 72*a* of the first engaging portion 72. Then, when the protrusion 102 of the second engaging portion 100 gets over the inclined surface 72*a* of the first engaging portion 72, the elastic deformation of the second engaging portion 100 is canceled, and the first engaging portion 72 is fit into the locking hole 104. That is, the first engaging portion 72 and the second engaging portion 100 are engaged with each other by a snap-fit system using bending (elastic deformation).

Figure 9:
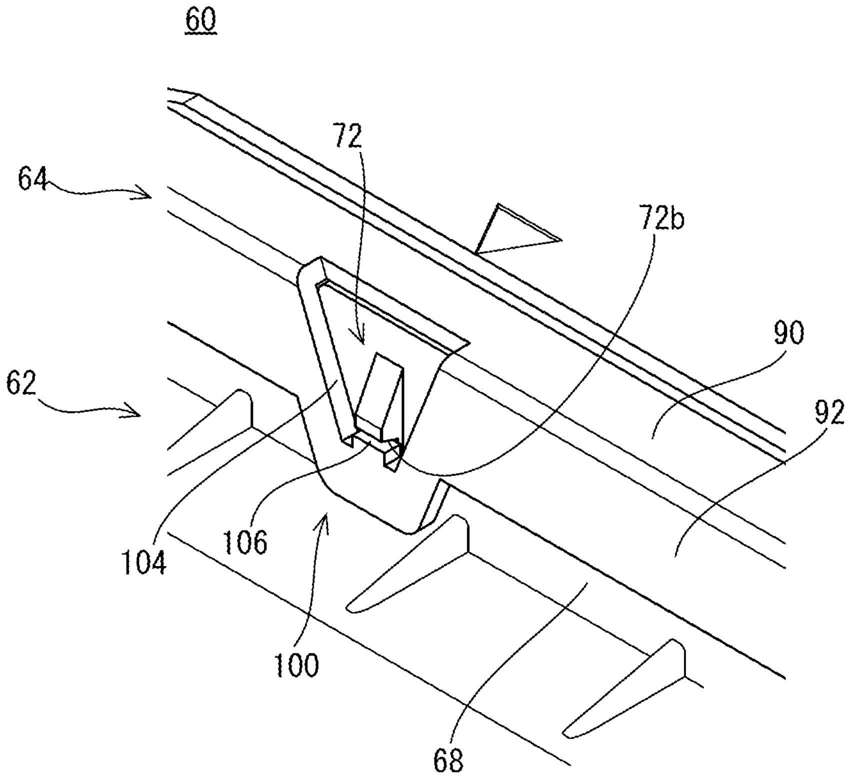
FIG. 9 is a perspective view showing a part around an engaging portion of the optical box.
Figure 10:
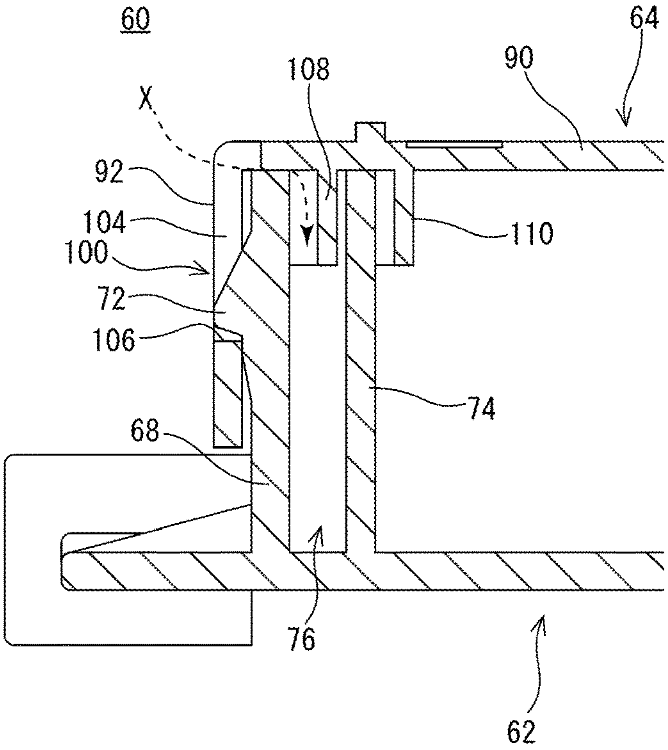
FIG. 10 is a longitudinal cross-sectional view showing a part around the engaging portion of the optical box.
Figure 11:
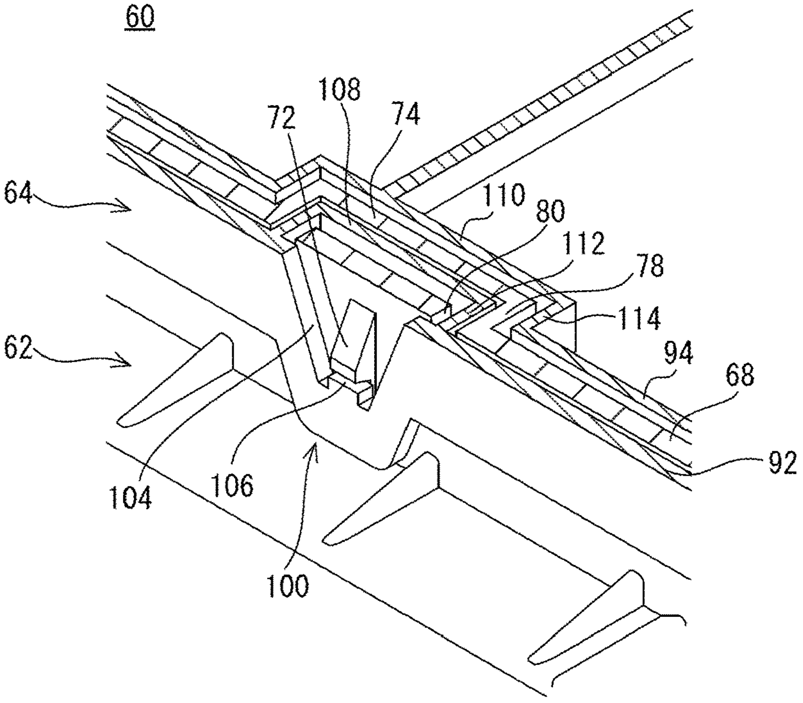
FIG. 11 is a lateral cross-sectional view showing a part around the engaging portion of the optical box.

Then, as shown in FIG. 9 to FIG. 11, when the first engaging portion 72 of the box main body 62 and the second engaging portion 100 of the cover member 64 are engaged with each other, the cover member 64 becomes to be locked to (prevented from being fallen off from) the box main body 62. At this time, the first barrier wall 108 of the cover member 64 enters the space 76 of the box main body 62, and the second barrier wall 110 is arranged so as to sandwich the vertical wall 74 of the box main body 62 with the first barrier wall 108. Moreover, a coupling portion of the first barrier wall 108 of the cover member 64 and the first fitting wall portion 92 (in this first embodiment, the first coupling walls 112) is fit into the slit 80 formed on the side wall 68 of the box main body 62.

In such an optical box 60, as shown in FIG. 10, even if the foreign matters X such as particles and dust invade through the locking hole 104 of the second engaging portion 100, the foreign matters X may be intercepted by the first barrier wall 108, and a moving direction thereof may be changed downward and thus remain in the space 76. At this time, since the moving direction of the foreign matters X in the space 76 is downward, the foreign matters X need to change its moving direction upward in order to invade into the inside of the box main body 62 (i.e., housing space for the optical component(s)) over the vertical wall 74, and therefore, it is difficult for the foreign matters X to cross over the vertical wall 74. Therefore, an invasion of the foreign matters X into the optical box 60 can be appropriately prevented. Moreover, even if the foreign matters X should cross over the vertical wall 74, the foreign matters X are intercepted by the second barrier wall 110, and the moving direction thereof is changed downward, and therefore, the foreign matters X stay in a peripheral edge portion (i.e., near the side wall 68) in the optical box 60. Therefore, it is possible to reduce or prevent the foreign matters X from affecting the optical component(s). That is, in this first embodiment, by having double structure in which the vertical wall 74 and the pair of barrier walls 108 and 110 are provided inside the first engaging portion 72 and the second engaging portion 100, and by providing the space 76 between the outside and the inside of the optical box 60, the foreign matters X having passed through the locking hole 104 are retained in the space 76, and the foreign matters X may be prevented from entering the optical box 60.

In other words, in this first embodiment, by providing the recess portion that is recessed inward on each of the side wall 68 of the box main body 62 and the pair of fitting wall portions 92 and 94 of the cover member 64, and by arranging the first engaging portion 72 and the second engaging portion 100 in the recess portion, the foreign matters X are prevented from entering the optical box 60 through the locking hole 104 of the second engaging portion 100.

As described above, according to the first embodiment, the vertical wall 74 is provided in the box main body 62 so as to form the space 76 inside the first engaging portion 72, and the cover member 64 is formed with the first barrier wall 108 that enters the space 76, and therefore, an invasion of the foreign matters X into the optical box 60 can be prevented appropriately. Accordingly, it is possible to secure a dust-proof property of the optical box 60 (exposure unit 32) without tightly fastening the box main body 62 and the cover member 64 by a fastening member such as screws, or without providing a shock absorbing material between the box main body 62 and the cover member 64.

Moreover, since the second barrier wall 110 that sandwiches the vertical wall 74 with the first barrier wall 108 is formed on the cover member 64, even if the foreign matters X should invade in the optical box 60, it is possible to retain the foreign matters X near the side wall 68, and thus, it is possible to reduce or prevent the foreign matters X from affecting the optical component(s).

Second Embodiment

Figure 12:
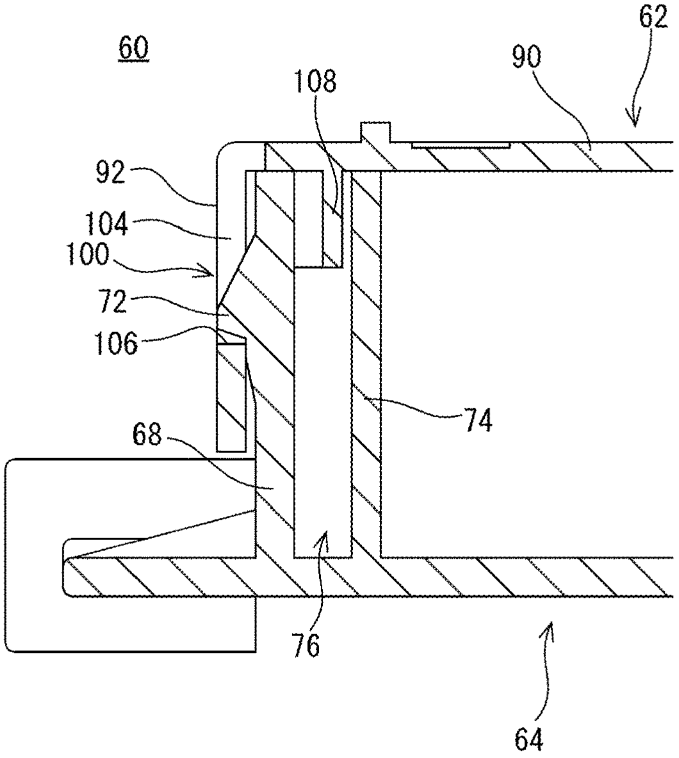
FIG. 12 is a longitudinal cross-sectional view showing a part around an engaging portion of an optical box provided on an image forming apparatus of a second embodiment according to the present invention.

Next, with reference to FIG. 12, an image forming apparatus 10 that is the second embodiment according to the present invention will be described. This second embodiment is different from the first embodiment in structure of the optical box 60 that is provided on the exposure unit 32. Since other portions are the same as those of the above-described first embodiment, duplicate description will be omitted or simplified.

In the second embodiment, the cover member 64 of the optical box 60 has only the first barrier wall 108 out of the pair of barrier walls 108 and 110, and the second barrier wall 110 is not formed on the cover member 64.

Also in this second embodiment, similar to the first embodiment, it is possible to appropriately prevent an invasion of the foreign matters X into the optical box 60.

Third Embodiment

Figure 13:
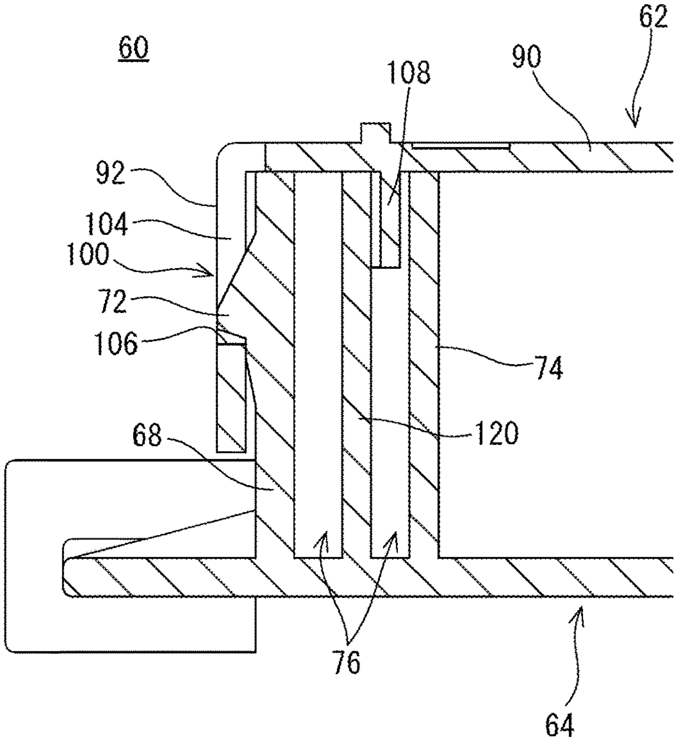
FIG. 13 is a longitudinal cross-sectional view showing a part around an engaging portion of an optical box provided on an image forming apparatus of a third embodiment according to the present invention.

Subsequently, with reference to FIG. 13, an image forming apparatus 10 that is the third embodiment according to the present invention will be described. This third embodiment is different from the above-described second embodiment in structure of the optical box 60 that is provided on the exposure unit 32. Since other portions are the same as those of the above-described first embodiment or second embodiment, duplicate description will be omitted or simplified.

In the third embodiment, in addition to the vertical wall (first vertical wall) 74, a second vertical wall 120 is formed on the cover member 64 of the optical box 60, which is erected in the space 76 so as to sandwich the first barrier wall 108 with the vertical wall 74.

Also in this second embodiment, similar to the first embodiment and the second embodiment, it is possible to appropriately prevent an invasion of the foreign matters X into the optical box 60. Moreover, it is possible to more certainly retain the foreign matters X in the space 76 by the second vertical wall 120.

In addition, although a locking projection is provided on the box main body and a locking hole engageable with the locking projection is provided on the cover member in each of the above-described embodiments, a locking projection and a locking hole engageable with the locking projection may be provided on the cover member and the box main body, respectively. That is, the first engaging portion formed on the box main body may include a locking hole and the second engaging portion formed on the cover member may include a locking projection.

Fourth Embodiment

Subsequently, with reference to FIG. 14-FIG. 17, an image forming apparatus 10 that is the fourth embodiment according to the present invention will be described. In this fourth embodiment, a configuration of the housing cover (cover member) included in the optical box 60 is elaborated. In addition, description duplicate with those of each of the above-described embodiments will be omitted or simplified. In the following, specific description will be made.

Figure 14A:
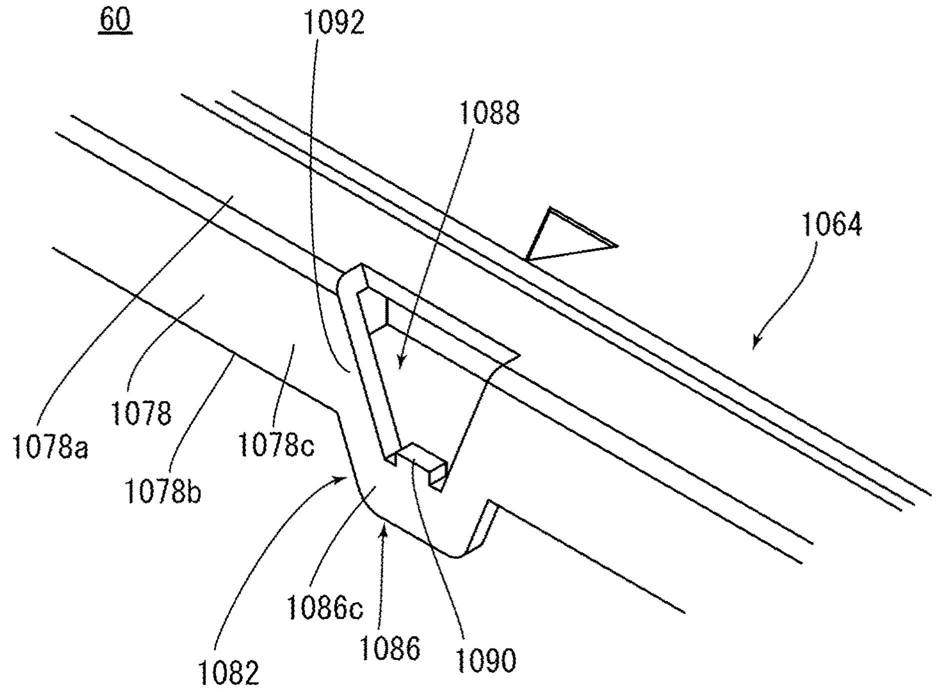
FIG. 14A and FIG. 14B are disassembled perspective views showing while enlarging a part of an optical box provided on an image forming apparatus of a fourth embodiment according to the present invention.
Figure 14B:
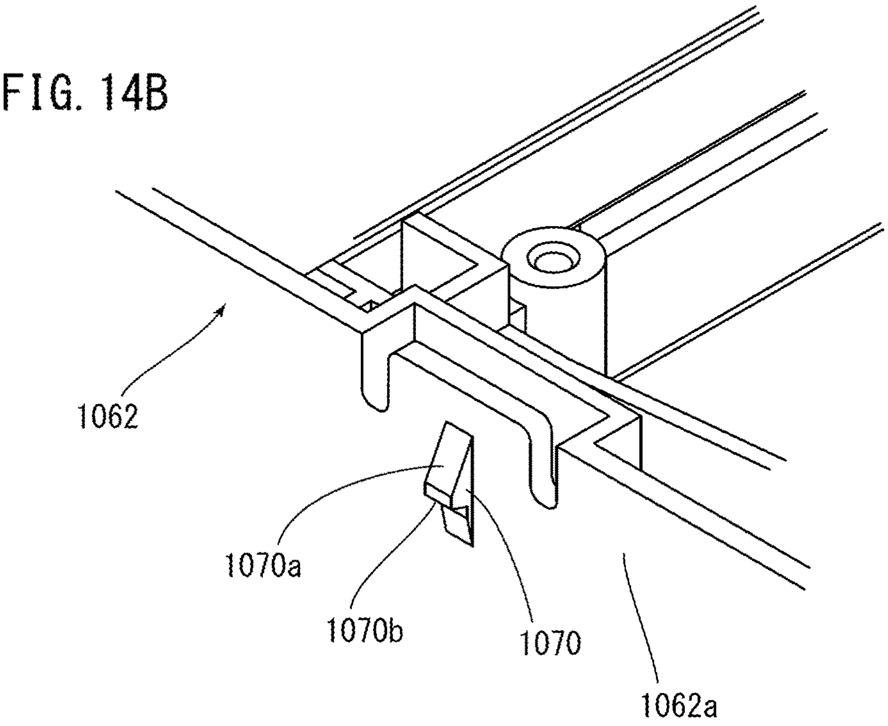

As shown in FIG. 14, each of a plurality of projecting portions (first engaging portion) 1070 has an inclined surface **1070*a* that is formed to be inclined so that a distance from an outer surface 1062*a* of a housing (box main body) 1062 becomes longer as it goes downward, and a stopper surface 1070*b* that is formed to be connected to a lower end of the inclined surface 1070*a* and be perpendicular to the outer surface 1062*a***.

Moreover, each of a plurality of claw portions (second engaging portion) 1082 has a protruding portion 1086 that is provided to be protruded downward from a lower end **1078*b* of a side wall portion (first fitting wall portion) 1078 of the housing cover 1064, and a recess portion 1088 that is formed above the protruding portion 1086 in a shape and size that allows the protruding portion 1086 to be inserted (accepted) from above. A positioning projection 1090 is provided on a bottom portion of the recess portion 1088 to be protruded upward and brought into contact to the stopper surface 1070***b* of the protruding portion 1070 from below. Moreover, each of the plurality of claw portions 1082 is provided on the side wall portion 1078 of the housing cover 1064 to be elastically deformable toward an outside. That is, the whole housing cover 1064 is formed of the injection molding of a synthetic resin, and thus, the claw portion 1082 becomes elastically deformable in a thickness direction thereof.

In the fourth embodiment, an inner surface (not shown) and an outer surface 1086*c* of the protruding portion 1086 are formed to be flush with an inner surface (not shown) and an outer surface 1078*c* of the side wall portion 1078. Therefore, an inner peripheral portion 1092 of the recess portion 1088 that is a part of the side wall portion 1078 is continuous to the protruding portion 1086 with the same thickness, and the inner peripheral portion 1092 and the protruding portion 1086 are unified, thereby to constitute the claw portion 1082.

Figure 15:
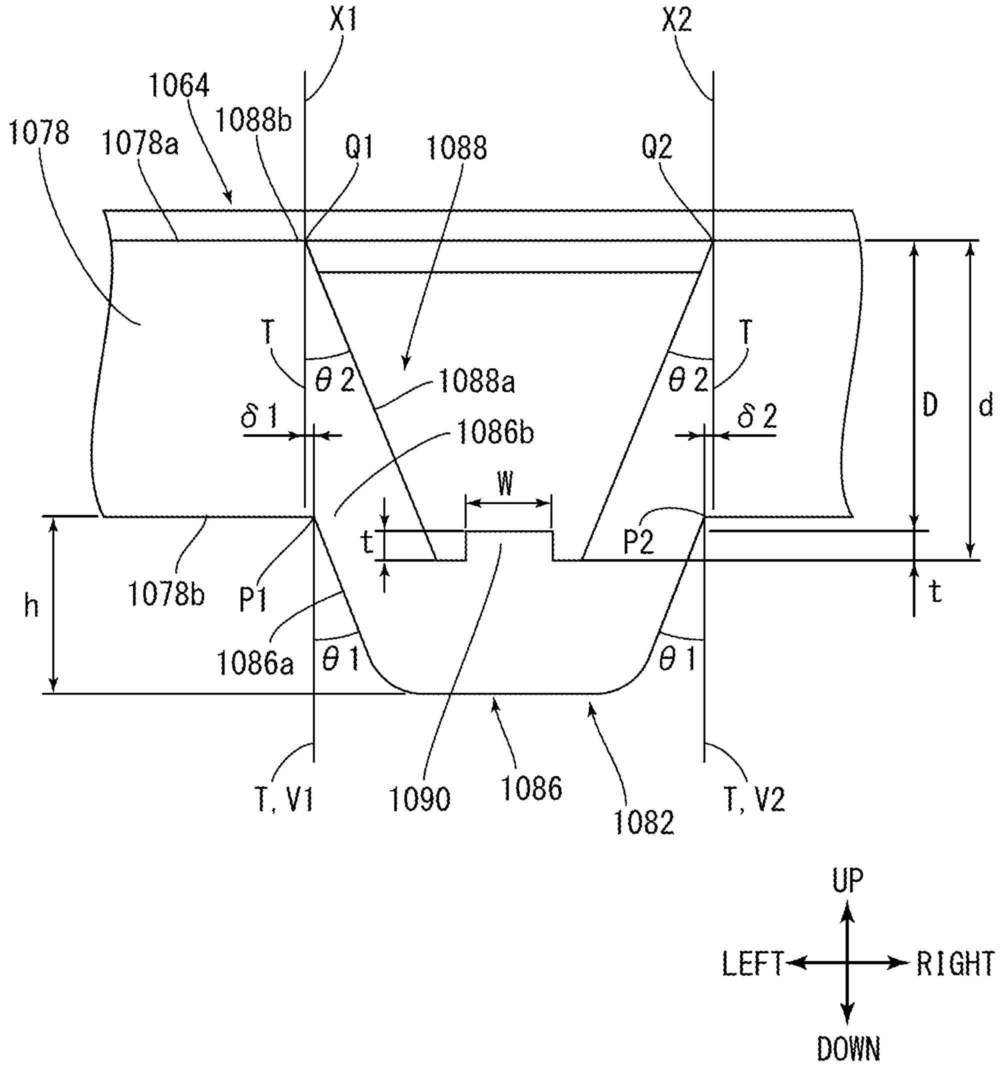
FIG. 15 is an enlarged front view showing structure of a major part of a housing cover.

FIG. 15 is an enlarged front view showing structure of a major part of the housing cover 1064. As shown in FIG. 15, when assuming that a direction that is parallel with a surface of the side wall portion 1078 and perpendicular direction with respect to the up-down direction is a width direction, each of the protruding portion 1086 and the recess portion 1088 is formed in a trapezoidal shape symmetrical in the width direction so that a length in the width direction (width) is gradually narrowed as it goes downward.

When assuming that a protruded length of the protruding portion 1086 from the lower end 1078*b* of the side wall portion 1078 is "h", a depth on appearance of the recess portion 1088 from the upper end 1078*a* of the side wall portion 1078 is "d" and a projected length of the positioning projection 1090 is "t", a substantial depth (hereinafter, simply referred to a "depth") of the recess portion 1088 can be represented as "D=d−t". Then, a relationship of "D>h" is satisfied between the protruded length "h" of the protruding portion 1086 and the depth "D" of the recess portion 1088. In addition, the positioning projection 1090 may be omitted, and "t=O" is obtainable in that case.

Moreover, in imaging a virtual reference line "T" extended in the up-down direction is imaged, and assuming that an inclination angle of a widthwise side edge 1086*a* of the protruding portion 1086 with respect to the virtual reference line "T" is theta 1 (θ1) and an inclination angle of a widthwise side edge 1088*a* of the recess portion 1088 with respect to the virtual reference line "T" is theta 2 (θ2), a relationship of "0 degrees <θ1<90 degrees" and a relationship of "θ1=θ2" are both satisfied. Accordingly, each of the protruding portion 1086 and the recess portion 1088 becomes as a shape of a symmetrical trapezoidal in the width direction, and the widthwise side edge 1086*a* of the protruding portion 1086 and the widthwise side edge 1088*a* of the recess portion 1088 become in parallel to each other.

Furthermore, two virtual insertion reference lines V1 and V2 extended in the up-down direction passing both ends P1 and P2 in the width direction at a base end 1086*b* of the protruding portion 1086 are arranged inside two virtual reception reference lines X1 and X2 extended in the up-down direction passing both ends Q1 and Q2 in the width direction at an open end 1088*b* of the recess portion 1088. That is, when assuming that a space or interval between the virtual insertion reference line V1 and the virtual reception reference line X1 is delta 1 (δ1) and a space or interval between the virtual insertion reference line V2 and the virtual reception reference line X2 is delta 2 (δ2), a relationship "δ1>0" and a relationship "δ2>0" are both satisfied.

For example, the above-described relational expressions can be satisfied at the time of d=11.5 mm, t=1.00 mm, h=5.60 mm, θ1=θ2=21.49 degrees and δ1=δ2=0.30 mm. At this time, a width W of the positioning projection 1090 is determined as 3.00 mm, for example. In addition, in order to sufficiently secure a strength of the claw portion 1082 by making the space between the widthwise side edge 1086*a* of the protruding portion 1086 and the widthwise side edge 1088*a* be wider, it is desirable that a relationship of "15 degrees <θ1<60 degrees, (θ1=θ2)" is satisfied. In this case, the spaces or intervals δ1 and δ2 become within a range of "0 mm<δ1<5.1 mm, (δ1=δ2)".

Figure 16:
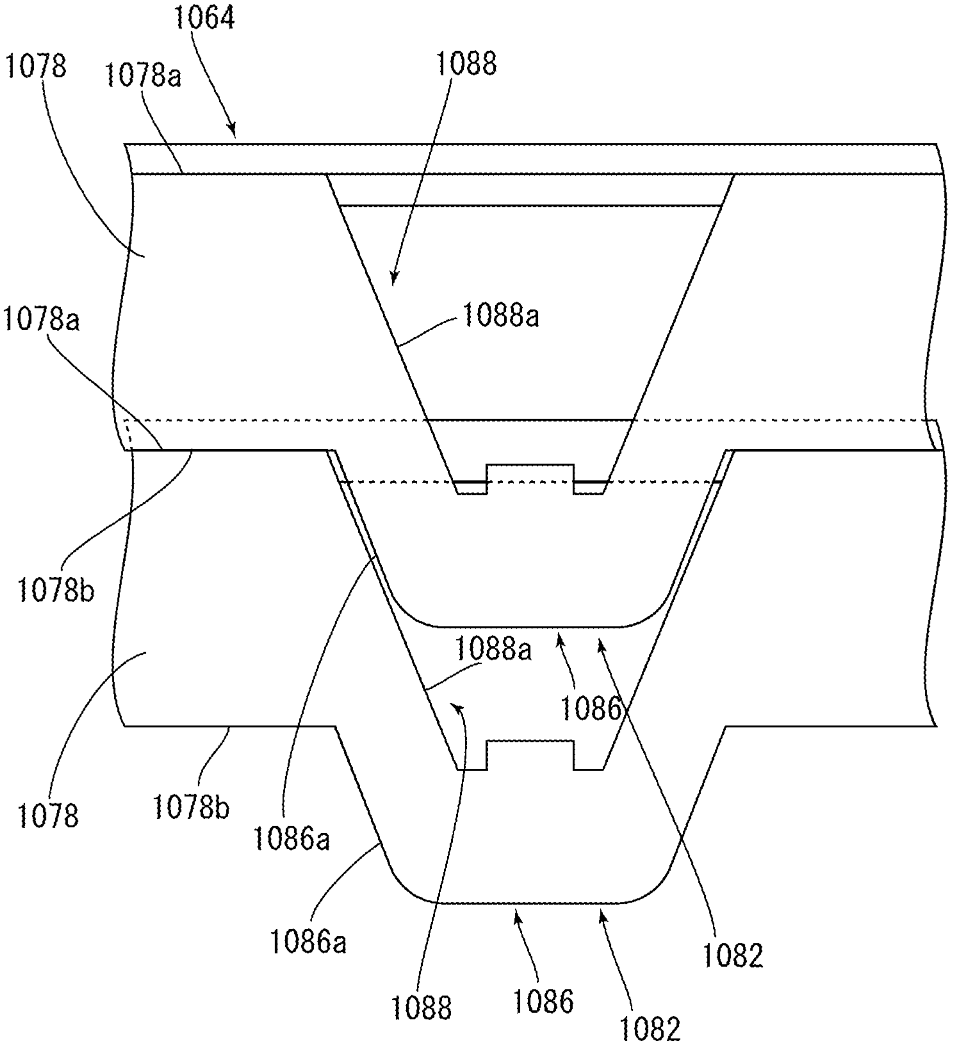
FIG. 16 is an enlarged front view showing a state where the housing covers are stacked in two (2) stages.

FIG. 16 is an enlarged front view showing a state where the housing covers 1064 shown in FIG. 15 are stacked in two (2) stages. As shown in FIG. 16, if the housing cover 1064 each satisfying the above-described relational expressions are stacked in two stages, the protruding portion 1086 is completely accommodated in the recess portion 1088. Accordingly, the lower end 1078*b* of the side wall portion 1078 in an upper housing cover 1064 and the upper end 1078*a* of the side wall portion 1078 in a lower housing cover 1064 are allowed to contact with each other, thereby to stack the two housing cover 1064 closely.

Figure 17:
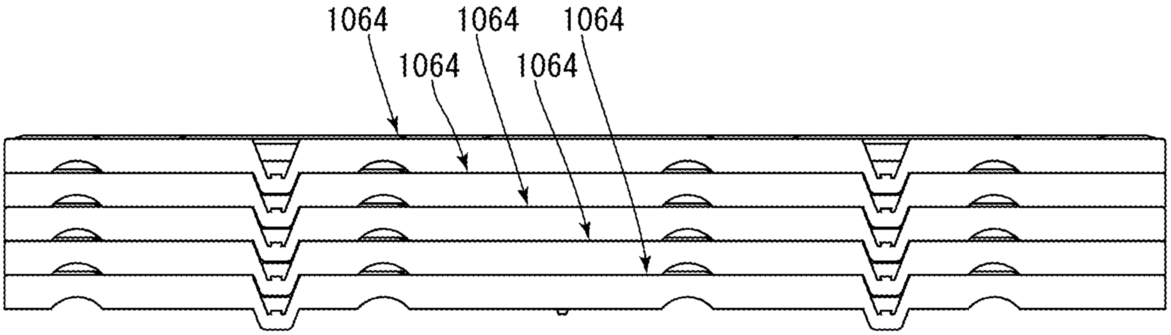
FIG. 17 is a front view showing a state where the housing covers are stacked in five (5) stages.

FIG. 17 is a front view showing a state where the housing covers 1064 shown in FIG. 15 are stacked in five (5) stages. As described above, since the housing covers 1064 can be closely stacked with each other without gaps, a total volume can be kept small even when the number of housing covers 1064 to be stacked is large. Accordingly, the packaging material can be miniaturized.

According to the optical box 60 and the housing cover 1064 of the fourth embodiment, with the above-described structure, following advantages can be obtained. That is, as shown in FIG. 16, since the claw portion 1082 has the protruding portion 1086 and the recess portion 1088 into which the protruding portion 1086 can be inserted from above, when the two housing covers 1064 are stacked one above the other, the protruding portion 1086 of the upper housing cover 1064 can be accommodated in the recess portion 1088 of the lower housing cover 1064. Moreover, the lower end 1078*b* of the side wall portion 1078 in the upper housing cover 1064 and the upper end 1078*a* of the side wall portion 1078 in the lower housing cover 1064 can be brought into contact with each other without a gap. Accordingly, a plurality of housing covers 1064 can be stacked most closely, and a transportation cost can be reduced because the total volume can be reduced.

As shown in FIG. 16, since the protruding portion 1086 of the claw portion 1082 is formed so that the width is gradually narrowed downward, when the two housing covers 1064 are stacked one above the other, the protruding portion 1086 of the upper housing cover 1064 can be easily inserted into the recess portion 1088 of the lower housing cover 1064. Moreover, at this time, since the inclination angle θ1 and the inclination angle θ2 are the same (FIG. 15), the widthwise side edge 1086*a* of the protruding portion 1086 can be brought into contact with the widthwise side edge 1088*a* of the recess 1088 by a line or plane, and therefore, it is possible to effectively regulate the movement of the protruding portion 1086 in the width direction. Furthermore, since the protruding portion 1086 and the recess portion 1088 can be brought into contact with each other in a direction orthogonally intersecting to the direction that the claw portion 1082 is elastically deformed, the damage to the claw portion 1082 can be suppressed.

As shown in FIG. 14, since the protruding portion 1086 and the side wall portion 1078 can be formed in a continuous plate shape, the structure is simple and the housing cover 1064 can be manufactured at low cost.

In addition, in the above-described fourth embodiment, the two projecting portions 1070 are formed on each of the four wall portions 1074*a*, 1074*b*, 1074*c* and 1074*d* constituting the side wall portion 1068 of the housing 62, but the number of projecting portions 1070 may be appropriately changed. For example, one or more than three (3) projecting portions 1070 may be formed on each of the four wall portions 1074*a*, 1074*b*, 1074*c* and 1074*d*. Moreover, one or more projecting portions 1070 may be formed on each of the front wall portion 1074*a* and the rear wall portion 1074*b*, and one or more projecting portions 1070 may be formed on each of the left wall portion 1074*c* and the right wall portion 1074*d*. In these cases, the number and positions of the claw portions 1082 of the housing cover 1064 are determined according to the number and positions of the projecting portions 1070.

Moreover, the specific structure of the image forming apparatus described above is each mere example, and to be changed appropriately in accordance with specifications of the actual products. For example, the image forming apparatus does not necessarily have to be a multifunction peripheral, and may be a copying machine, a facsimile, a printer or the like, or a multifunction peripheral that at least two of these are combined. Moreover, an image forming apparatus may be a monochrome machine that forms a monochromatic image to a recording medium.

Although the present invention has been described and illustrated in detail, it is clearly understood that the same is by way of illustration and example only and is not to be taken by way of limitation, the spirit and scope of the present invention being limited only by the terms of the appended claims. Furthermore, it is intended that the scope of the present invention covers all modifications within the meaning and range of equivalency of the claims.

What is claimed is:

1. An optical scanning device comprising an optical component and an optical box that houses the optical component, wherein the optical box includes:

a box main body having a bottom wall and a frame-shaped side wall erected from a peripheral edge portion of the bottom wall; and a cover member having a top wall that closes an upper opening of the box main body and a frame-shaped first fitting wall portion that is outer-fit to the frame-shaped side wall, the cover member further comprising:

a first engaging portion that is formed on the frame-shaped side wall;

a second engaging portion that is formed on the frame-shaped first fitting wall portion in an elastically deformable manner, the second engaging portion being engaged with the first engaging portion, thereby locking the cover member to the box main body;

a vertical wall that is erected on the box main body so as to form a space inside the first engaging portion, and that has both of its side end portions coupled to the frame-shaped side wall; and a first barrier wall that is protruded from the top wall toward the bottom wall so as to enter a space between the first engaging portion and the vertical wall, and that has both of its side end portions coupled to the frame-shaped first fitting wall portion.

2. The optical scanning device according to claim 1, wherein the first engaging portion includes a locking projection, and the second engaging portion includes a locking hole with which the locking projection engages.

3. The optical scanning device according to claim 1, wherein the cover member comprises a frame-shaped second fitting wall portion that is inner-fit to the frame-shaped side wall, and a second barrier wall that is protruded from the top wall toward the bottom wall so as to sandwich the vertical wall with the first barrier wall, and that has both of its side end portions coupled to the frame-shaped second fitting wall portion.

4. The optical scanning device according to claim 1, wherein the frame-shaped side wall has slits that are formed on both sides of the first engaging portion, and coupling portions of the first barrier wall and the frame-shaped first fitting wall portion are fit into the slits.

5. The optical scanning device according to claim 1, wherein the top wall is formed in a rectangular shape in a plan view, and the frame-shaped first fitting wall portion is formed in a rectangular frame-shape having four wall portions, and the second engaging portion is formed on each of the four wall portions.

6. The optical scanning device according to claim 5, wherein the top wall has a rectangular window that allows a light emitted from the optical component to pass, and the second engaging portions provided on two of the four wall portions opposite each other in a direction that the rectangular window is extended are provided in positions deviated from an extending line of the rectangular window in a plan view.

7. An image forming apparatus, comprising the optical scanning device recited in claim 1.

* * * * *